(12) United States Patent
McArthur et al.

(10) Patent No.: US 9,932,804 B2
(45) Date of Patent: Apr. 3, 2018

(54) ENTWINED PIPES

(71) Applicant: REELSAFE PTY LTD, Landsdale (AU)

(72) Inventors: Marcus McArthur, Lansdale (AU); Cameron McArthur, Landsdale (AU)

(73) Assignee: REELSAFE PTY LTD, Lansdale, WA (AU)

( * ) Notice: Subject to any disclaimer, the term of this patent is extended or adjusted under 35 U.S.C. 154(b) by 379 days.

(21) Appl. No.: 14/653,850

(22) PCT Filed: Dec. 19, 2013

(86) PCT No.: PCT/AU2013/001502
§ 371 (c)(1),
(2) Date: Jun. 18, 2015

(87) PCT Pub. No.: WO2014/094065
PCT Pub. Date: Jun. 26, 2014

(65) Prior Publication Data
US 2015/0330193 A1 Nov. 19, 2015

(30) Foreign Application Priority Data

Dec. 20, 2012 (AU) ................................ 2012905601
Dec. 21, 2012 (AU) ................................ 2012905641

(51) Int. Cl.
*E21B 43/12* (2006.01)
*B60P 3/03* (2006.01)
(Continued)

(52) U.S. Cl.
CPC .......... *E21B 43/121* (2013.01); *B60P 3/035* (2013.01); *E21B 17/203* (2013.01); *E21B 17/206* (2013.01); *E21B 19/22* (2013.01)

(58) Field of Classification Search
CPC ...... E21B 19/22; E21B 17/206; E21B 17/203; E21B 43/121
See application file for complete search history.

(56) References Cited

U.S. PATENT DOCUMENTS 607,932 A * 7/1898 Husham ................... F16L 9/18
138/111
2,798,435 A * 7/1957 Armstrong ............. A62C 27/00
166/105

(Continued)

FOREIGN PATENT DOCUMENTS

GB 2398617 A 8/2004

OTHER PUBLICATIONS

International Search Report dated Feb. 4, 2014 from International Application No. PCT/AU2013/001502, pp. 1-7.

(Continued)

*Primary Examiner* — Jennifer H Gay
(74) *Attorney, Agent, or Firm* — MH2 Technology Law Group, LLP

(57) ABSTRACT

A repeatedly usable downhole pumping assembly including; a conduit comprising a plurality of pipes, wherein the pipes are uniformly entwined together along their length to provide multiple fluid passageways, wherein the conduit is to be wound onto a reel and off the reel repeatedly; a rotatably mounted reel, upon which the conduit is adapted to be wound without collapsing; a pump for pumping fluid through the conduit; and a driving means to lower and raise the conduit relative to the bore.

18 Claims, 16 Drawing Sheets

(51) Int. Cl.
    *E21B 19/22* (2006.01)
    *E21B 17/20* (2006.01)
    *B60P 3/035* (2006.01)

(56) References Cited

U.S. PATENT DOCUMENTS

| | | | | |
|---|---|---|---|---|
| 2,876,916 | A * | 3/1959 | Austrow | B60P 3/035 |
| | | | | 414/467 |
| 3,526,086 | A * | 9/1970 | Morgan | F16L 9/18 |
| | | | | 138/111 |
| 3,690,136 | A * | 9/1972 | Slator | B21C 47/18 |
| | | | | 166/77.2 |
| 4,228,967 | A * | 10/1980 | Woodruff | B60P 3/035 |
| | | | | 242/390.5 |
| 4,673,035 | A * | 6/1987 | Gipson | E21B 19/22 |
| | | | | 166/77.1 |
| 4,718,486 | A | 1/1988 | Black | |
| 4,843,713 | A * | 7/1989 | Langner | D07B 3/00 |
| | | | | 29/469 |
| 4,979,296 | A * | 12/1990 | Langner | D07B 3/00 |
| | | | | 29/469 |
| 5,176,364 | A * | 1/1993 | Bell | B66D 1/08 |
| | | | | 254/291 |
| 5,667,369 | A * | 9/1997 | Cholet | E21B 43/121 |
| | | | | 166/105 |
| 5,839,514 | A * | 11/1998 | Gipson | E21B 19/22 |
| | | | | 166/384 |
| 5,848,642 | A | 12/1998 | Sola | |
| 6,092,756 | A * | 7/2000 | Sola | B65H 75/4413 |
| | | | | 166/77.2 |
| 7,152,672 | B1 * | 12/2006 | Gipson | E21B 19/22 |
| | | | | 166/77.2 |
| 7,669,651 | B1 * | 3/2010 | Carstensen | E21B 47/0008 |
| | | | | 166/105 |
| 2002/0125014 | A1 | 9/2002 | Dearing et al. | |
| 2009/0055029 | A1 * | 2/2009 | Roberson | E21B 47/00 |
| | | | | 700/282 |
| 2009/0218106 | A1 * | 9/2009 | Stukey | E21B 43/128 |
| | | | | 166/384 |
| 2013/0168484 | A1 * | 7/2013 | Novotny | F16L 1/0243 |
| | | | | 242/419.8 |
| 2014/0116724 | A1 * | 5/2014 | McDougall | E21B 34/14 |
| | | | | 166/380 |
| 2015/0292282 | A1 * | 10/2015 | Dyck | E21B 19/008 |
| | | | | 166/385 |
| 2015/0330193 | A1 * | 11/2015 | McArthur | B60P 3/035 |
| | | | | 166/369 |
| 2016/0258231 | A1 * | 9/2016 | Naumann | E21B 17/003 |
| 2016/0369608 | A1 * | 12/2016 | Novotny | E21B 19/22 |

OTHER PUBLICATIONS

Written Opinion of the International Search Report dated Feb. 4, 2014 from International Application No. PCT/AU2013/001502, pp. 1-8.

* cited by examiner

ENTWINED PIPES

CROSS REFERENCE TO RELATED APPLICATIONS

This application is a U.S. National Stage application of PCT/AU2013/001502 filed 19 Dec. 2013, which claims priority to Australian Application No. 2012905601 filed 20 Dec. 2012 and Australian Application No. 2012905641 filed 21 Dec. 2102, the entire disclosures of which are hereby incorporated by reference in their entireties.

TECHNICAL FIELD

The present invention in one aspect, generally relates to a downhole pumping assembly, and in another to a fluid carrying pipe.

BACKGROUND ART

The type of pipe that can be stored on a reel is limited by many factors. A stiff pipe cannot be rolled onto a reel. As pipe stiffness is related to the diameter of a pipe, large diameter pipes are of lower stiffness. Therefore, a pipe of large diameter, or of thin wall thickness, cannot be stored on a reel as it is likely to collapse when wound onto the reel. Also the inside diameter of the reel dictates the initial layer or layers of pipe to be reeled, and cannot be too small as a small diameter will encourage kinking and collapse of the pipe. Generally, for a pipe to readily coil on a reel the inside diameter of the reel needs to be many times the diameter of the pipe.

Another limiting factor on the size of reeled pipes relates to the constraints associated with transportation. Due to the limitations, both inherent and regulatory, associated with reels and road transportation, large diameter, high flow pipes cannot readily be transported on a reel.

Conventionally, where high flow pipe is required, the pipe must either be wound in short lengths on large diameter reels that are too large for easy transportation, or supplied in short individual lengths that require coupling together at site. Commonly these short individual lengths are 12 m to 18 m.

Where high flow bore pumping is required, straight short individual lengths of pipe are transported to the bore site and are then craned into position and welded or otherwise connected together. This requires multiple pieces of equipment such as trucks and cranes in addition to several technicians. Due to the inherent risk involved there is also the need of safety personnel to ensure that suspended loads are dealt with appropriately.

In relation to travelling irrigation sprinklers, the spray area is limited to the diameter of the pipe used and either large numbers of pumps and pipes in close proximity are used on small nominal bore reeled pipe so that the travelling sprinklers can extend large distances with a wide spray. This requires many lengths of pipe and pumps to achieve good spay coverage. Alternatively large diameter pipes are used, but these limit the distance the travelling sprinklers can travel due to the difficulty in reeling large diameter pipe.

When typical test pumping is undertaken variable flow is required. To accommodate this, a variety of different volume pumps are needed with associated different diameter riser pipes to cater for different levels of water and different required pressures and flows. This requires multiple pieces of equipment and skilled staff to change between required pumps and risers as needed. To change between different pumps and risers takes time and expense that could be otherwise spent pumping.

Conventionally, when bores require a high flow downhole pumping device of large flow rate capacity, a pipe needs to be lowered into the bore or raised from the bore. In some applications a pipe diameter of 110 mm or larger is required to meet the desired flow rate. Due to the diameter of the pipe, the pipe cannot be rolled onto a reel without the pipe collapsing. As a result, pipes of large diameter are typically supplied in straight lengths of up to 6 m. These straight lengths are transported to the bore site on trucks, coupled together and then lifted with a crane as a suspended load to be placed into the bore. The straight lengths are lowered by the crane and joined together whilst in an upright orientation. Flexible lay flat pipe may be used, but requires a crane and manpower crew for the installation and still involves lowering the pipe in section.

This conventional method of lowering a high flow pipe and pump into a bore requires a crane to suspend and support the high flow pipe and pump using chain. A crane is required due to the size and weight of the required high flow pipe. To meet site requirements, technicians and a safety supervisor are required to be on site each time operations to lower and operate or raise the pumping assembly are conducted. An electricity cord travels down the side of the high flow pipe and the pump to power the pump. The high flow pipe can be a large diameter flexible pipe, connected to pump to direct the pumped fluid to a desired location.

The coupling, lowering and raising of pipes is time consuming and requires a team of technicians, safety supervisors as well as multiple pieces of equipment. It also places the technicians and supervisors in direct danger as they must physically interact with the suspended pipe to raise, lower and couple them.

Where conventional test pumping is undertaken, a submersible pump, an electric cable, a stainless steel security cable, a monitoring tube and a rising/delivery pipe are lowered down a water containing bore/well. When different flow rates are required for different testing applications pipes of different diameters coupled with pumps of different capacity are required to be placed in the bore. Raising and lowering of the test pump is required each time a different diameter pipe or different flow pump is needed. This involves a crane, suspended loads and technicians every time, costing money and placing the technicians at risk. The time taken to raise or lower the pipe, connecting or disconnecting the straight lengths with the aid of a crane can take hours.

The preceding discussion of the background art is intended to facilitate an understanding of the present invention only. The discussion is not an acknowledgement or admission that any of the material referred to is or was part of the common general knowledge as at the priority date of the application.

The preceding discussion of the background art is intended to facilitate an understanding of the present invention only. The discussion is not an acknowledgement or admission that any of the material referred to is or was part of the common general knowledge as at the priority date of the application.

SUMMARY OF INVENTION

It is an object of this invention to ameliorate, mitigate or overcome, at least one disadvantage of the prior art, or which will at least provide the public with a practical choice.

In a first aspect, the present invention provides a conduit for pumping fluid from an external reservoir such as a bore comprising:

a plurality of pipes;

wherein the pipes are uniformly entwined together along their length to provide multiple fluid passageways; and wherein the conduit is to be wound onto a reel and off the reel repeatedly.

The uniform entwinement ensures that fluid travelling through each of the plurality of pipes travels at the same rate through the grouped entwined pipe. The multiple fluid passageways ensure that the conduit transports more fluid than any of the individual plurality of pipes.

Preferably, the conduit is adapted to be wound onto a reel and the reel is adapted to be transported on a truck.

The reeling of the conduit and its transportability increase the ease with which the conduit can be used in different locations for different applications.

Preferably, the conduit transports a greater volume of fluid than the individual pipes, wherein the individual pipes do not collapse when wound onto the reel, and wherein each pipe is adapted to transport fluid from one end of the conduit to the other end at the same rate.

In not being collapsible, the life span of the individual pipes is increased.

Preferably, each of the pipes is selectively closable.

By being selectively closable, different flows can be achieved through the conduit.

Preferably, the plurality of pipes are adapted to be operatively connected to a pump, and wherein the pump is adapted to be lowered into, and pump from, a bore.

Each pipe may be adapted to transport fluid from one end of the grouped entwined pipe to the other end at the same rate. This ensures that the grouped entwined pipe operates as if it were a pipe having a larger diameter but with the added flexibility of coiling at a smaller diameter.

Each pipe in the grouped entwined pipe may be equal in length.

The plurality of pipes may be entwined by twisting the pipes relative to each other about a central axis of the grouped entwined pipe. This allows the individual pipes of the grouped entwined pipe to be of the same length but still be coiled.

In another aspect of the invention the plurality of pipes may be entwined by braiding the pipes together.

In a yet a further aspect of the invention the plurality of pipes may be entwined by plaiting the pipes together.

Each of the plurality of pipes may be of different diameter.

The pipes may be retained in the entwined arrangement with engagement means. The engagement means maintains the entwinement and shape of the grouped entwined pipe.

The engagement means may be shrink wrap adapted to enclose the grouped entwined pipe.

The engagement means may be cable ties adapted to enclose the grouped entwined pipe.

The engagement means may be a manifold adapted to engage the plurality of pipes.

The grouped entwined pipe may be adapted to transport greater than 80l per second.

Each of the plurality of pipes may have a diameter of at least 90 mm.

The grouped entwined pipe may be operatively connected to a pump. The pump can be a submersible pump.

Each of the pipes may be selectively closable. This allows variable flow rates to pass through the grouped entwined pipe with only selected pipes transporting fluid.

Each pipe may include at least one valve adapted to selectively close the pipe that it is associated with.

Each pipe at an end of the grouped entwined pipe may engage a manifold.

The manifold may secure the end of each pipe relative to each other. The manifold may be adapted to couple with other pipes or machinery.

The grouped entwined pipe may be over 100 m long.

In a further aspect of the present invention, there is provided a method of installing, operating and withdrawing a transportable high flow downhole pumping assembly from a bore, including:

positioning the downhole pumping assembly around the bore;

unwinding a reeled high flow fluid passageway and lowering it into the bore;

pumping fluid from the bore;

ceasing pumping; and winding the high flow fluid passageway onto the reel to raise and withdraw the fluid passageway from the bore;

wherein the high flow fluid passageway comprising a plurality of pipes for pumping fluid from the bore; and wherein the pipes are uniformly entwined together along their length to provide multiple fluid passageways.

This method allows a downhole pumping assembly to be used on a bore without the need of a technical team and safety team accompanied by cranes.

The method may include the steps of moving the reeled non-collapsed fluid passageway into an installation condition, unwinding the fluid passageway and lowering it into the bore, positioning the reeled fluid passageway into an operating condition and pumping fluid from the bore, ceasing pumping, positioning the reeled fluid passageway into the installation condition winding the fluid passageway onto the reel to raise and withdraw the fluid passageway from the bore.

The fluid passageway may be the conduit comprising a plurality of pipes.

The installation condition may be an upright position.

The installation and operating conditions may be the same position.

A motorized driving device may be used to wind and unwind the fluid passageway.

The method may include pumping fluid through the fluid passageway at a rate of 70 liters per second (l/s) or greater.

In yet a further aspect, the present invention provides a downhole pumping assembly adapted to pump fluid from an external fluid reservoir including:

a conduit comprising a plurality of pipes for pumping fluid from the fluid reservoir, the conduit having a high flow rate capacity;

a reel, upon which the fluid passageway may be wound without collapsing, the reel being rotatably mounted;

a pump for pumping fluid through the fluid passageway; and a driving means to lower and raise the fluid passageway relative to the bore.

The downhole pumping assembly may include a mast to which the reel is rotatably mounted, wherein the mast is moveable between an installation condition and an operating condition. The mast positions the reel so that the fluid passageway can be lowered and operated in the bore.

The installation condition may position the mast in an upright position.

The installation and operating conditions may be the same position.

The operating condition may position the mast at an angle with respect to the vertical.

Preferably, the method is performed from a transportable platform. This enables the assembly to be moved between different bores where the method can be applied. By performing the method on a transportable platform, the assembly can be transported to the bore site and deployed and brought into operation quickly with minimal supervision.

The transportable platform may be the tray of a truck. This enables the assembly to be moved between sites using a truck.

In another aspect, the present invention provides a method of installing, operating and withdrawing from a bore a high flow downhole pumping assembly located on a transportation vehicle, including positioning the transportation vehicle around the bore, moving the reeled non-collapsed fluid passageway into an installation condition, unwinding the fluid passageway from the reel and lowering it into the bore, positioning the reeled fluid passageway into an operating condition and pumping fluid from the bore, ceasing pumping, positioning the reeled fluid passageway into the installation condition winding the fluid passageway onto the reel to raise and withdraw the fluid passageway from the bore. This method allows a downhole pumping assembly to be used on a bore without the need of a technical team and safety team accompanied by cranes.

This method allows a downhole pumping assembly to be used on a bore without the need of a technical team and safety team accompanied by cranes.

The downhole pumping assembly may include a mast to which the reel is rotatably mounted, wherein the mast is moveable between an installation condition and an operating condition. The mast positions the reel so that the fluid passageway can be lowered and operated in the bore.

The installation condition may position the mast in an upright position.

The installation condition and the operating condition may be the same position.

The operating condition may position the mast at an angle with respect to the vertical.

The reel may rest on a surface of the transportation vehicle in the operating condition.

In one aspect of the invention the fluid passageway is in the form of a single pipe.

In another aspect of the invention the fluid passageway is in the form of a pipe comprising a plurality of entwined individual pipes. The entwined pipes help to enable the reelability of the high flow pipe.

The downhole pumping assembly may pump fluid through the fluid passage way at a rate of 70l/s or greater.

The present invention further provides a method of installing, operating and withdrawing a transportable high flow downhole pumping assembly relative to a bore the assembly being located on a vehicle and movable between an operating condition and an installation condition, the method comprising:

positioning the assembly relative to the bore such that a fluid passageway of the assembly may be received in the bore;

activating a drive means to cause the fluid passageway to be lowered into the bore the required depth; and activating a pump to pump fluid from the bore through the fluid passageway.

Preferably the assembly is moved from the operating condition to the installation condition after the assembly is positioned relative to the bore.

Preferably, after lowering the fluid passageway into the bore the assembly is moved from the installation position to the operating condition prior to activating the pump.

When activating the drive means the drive means may cause a reel to rotate such that the fluid passageway unwinds from the reel as it is lowered into the bore.

Preferably the pump may be regulated to adjust the flow rate without the need to remove the fluid passageway from the bore.

Once the pumping is complete the assembly may be moved to the installation condition and the fluid passageway may be wound back on to the reel.

In yet a further aspect, the present invention provides a transportable downhole pumping assembly for pumping fluid from a bore, including a fluid passageway having a high flow rate capacity, a reel, upon which the fluid passageway may be wound, the reel being rotatably mounted to a supporting frame, a pump for pumping fluid through the fluid passageway, and a driving means to lower and raise the fluid passageway relative to the bore. The high flow fluid passageway allows for fast and safe operation of the assembly.

In one aspect of the invention the fluid passageway is in the form of a single pipe.

In another aspect of the invention the fluid passageway is in the form of a pipe comprising a plurality of entwined individual pipes. The entwined pipes help to enable the reelability of the high flow pipe.

The driving means may be a motor.

The driving means may be remotely operable. The remote operation reduces the man power required and increases safety.

The pump may be remotely operable.

The pump may include a variable speed drive to enable pumping of different flow rates.

Preferably the downhole pumping assembly is located no more than 3 m above ground level. This means that the operation of the assembly is not at a height that requires cranes and suspended loads, hence reducing required safety precautions.

The downhole pumping assembly may be adapted to be transported on the back of a truck. This allows the easy positioning of the pipe.

The downhole pumping assembly may be adapted to operate on the back of a truck. This allows easy, safe use of the reeled pipe and reduces the number of people required during operation.

The downhole pumping assembly may include a mast to which the reel is rotatably mounted, wherein the mast is moveable between an installation condition and an operating condition. The mast enables the reel to be located and allows the fluid passageway to be installed relative to the bore in a safe manner.

The pipe may be lowered into a bore hole when the mast is in the installation condition.

The pipe may transport fluid when the mast is in the operating condition.

The mast may be in an upright position when in the installation condition. The installation condition being upright ensures that gravity assists the unwinding of the fluid passageway in the maximum possible way.

The mast may be angled with respect to the vertical when in the operating condition. By moving the mast out of the vertical position, the mast is less obtrusive as it protrudes less from what the mast is attached to.

The fluid passageway may be capable of transporting fluid at 70 l/s or greater.

The pipe may include a submersible pump attachable to an end distal from the reel.

In still a further aspect of the present invention, there is provided a downhole pumping assembly located on the tray of a truck for pumping fluid from a bore is provided including, a fluid passageway having a high flow rate capacity, a reel, upon which the fluid passageway may be wound, the reel being rotatably mounted to a supporting frame, a pump for pumping fluid through the fluid passageway, and a driving means to lower and raise the fluid passageway relative to the bore, wherein the supporting frame is positionable into an installation condition from which the fluid passageway can be unwound to lower and rewound to raise, and an operating condition from which the assembly can pump fluid, a pump for pumping fluid through the fluid passageway, and a driving means to lower and raise the fluid passageway relative to the bore. This high flow fluid passageway allows for fast and safe operation of the assembly.

The installation condition and the operating condition may be the same position.

The downhole pumping assembly may include a mast to which the reel is rotatably mounted, wherein the mast is moveable between the installation condition and an operating condition. The mast enables the reel to be located and allows the fluid passageway to be installed relative to the bore in a safe manner.

The pipe may be capable of transporting fluid at 70 l/s or greater.

The pump may include a variable speed drive to enable pumping at different flow rates.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

DESCRIPTION OF EMBODIMENTS OF THE INVENTION

The first, second and third embodiments of the present invention provide a conduit/grouped entwined pipe 61 made up of a plurality of individual pipes entwined with each other. The grouped entwined pipe then provides a flow capability much greater than that of the flow capability of the individual pipes making up the plurality of pipes. It also enables the grouped entwined pipe 61 to be wound onto a reel without collapsing in on itself. The conduit/grouped entwined pipe of the present invention is capable of being repeatedly wound onto and off a reel.

Figure 2:
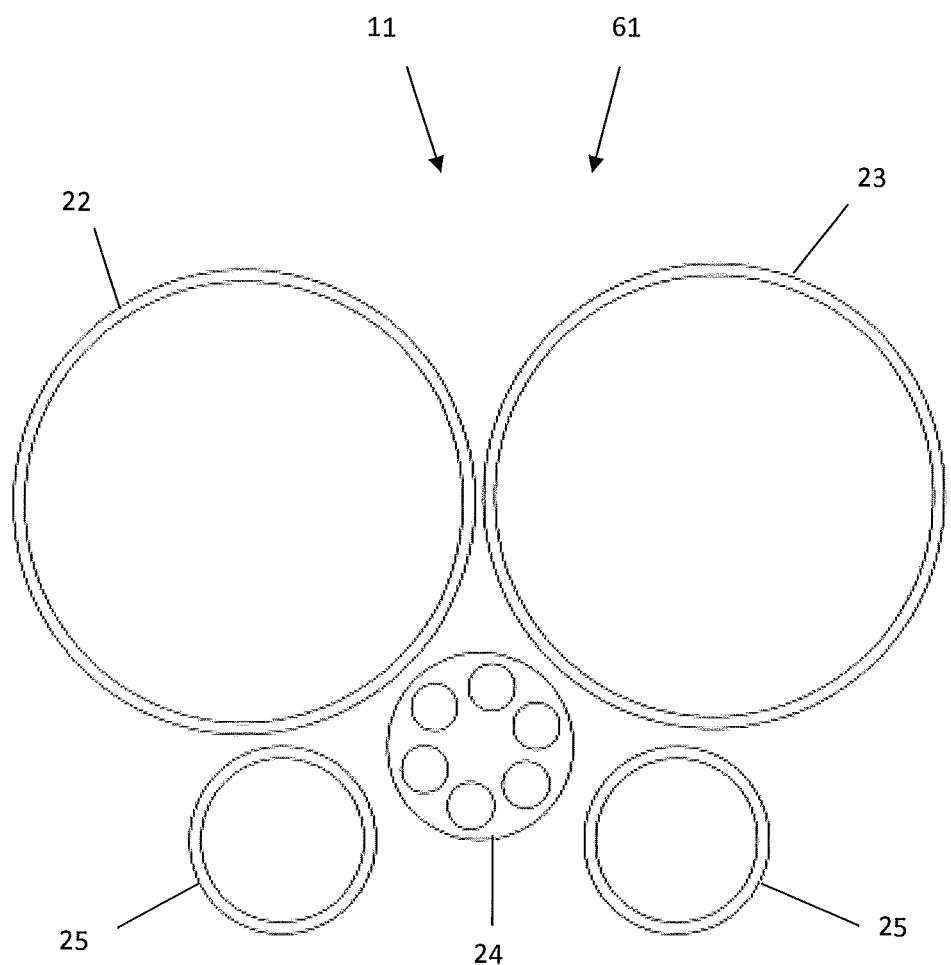
FIG. 2 is a front view of a grouped entwined pipe according to a first embodiment of the present invention.

Referring to FIG. 2, the invention according to a first embodiment, the grouped entwined pipe is in the form of a conduit/grouped entwined pipe 11, comprising two individual pipes 22, 23 entwined together with a power conduit 24 and minor conduits 25. This provides a pipe having two fluid passageways through individual pipes 22, 23. The grouped entwined pipe 11 provides flow capabilities equal to a much larger diameter pipe than each of the individual pipes 22, 23, while maintaining the ability to be wound onto a reel without collapsing. The individual pipes 22, 23 are twisted with respect to each other around the central axis of the grouped entwined pipe 11. This twisting entwines the individual pipes 22, 23 in a similar manner to that of the individual strands of a rope.

By entwining the pipes together, each individual pipe 22, 23 is entwined equally with respect to each other so that the length of each individual pipe 22, 23 is the same between opposite ends of the grouped entwined pipe 11. This ensures that fluid entering each of the individual pipes 22, 23 at one end of the grouped entwined pipe 11, will exit the other end of the grouped entwined pipe at the same time.

The entwinement of the individual pipes 22, 23 also ensures that when the grouped entwined pipe 11 is wound onto a reel there is no difference in the distance traveled around the reel by each individual pipe 22, 23. As each pipe 22, 23 twists equally around the central axis of the grouped entwined pipe 11, each pipe 22, 23 maintains the same mean diameter from the central axis of the grouped entwined pipe.

Barlow's equation to calculate the bursting pressure for a pipe recites:

$$P=(2*S*T)/(OD)$$

where P is the bursting pressure of the pipe;
S is the pipe's material strength;
T is the wall thickness of the pipe; and
OD is the outside diameter.

From this it is known that pipes having a small outside diameter can withstand a greater internal pressure than a larger diameter pipe of the same wall thickness. Therefore, larger diameter pipes, which obviously have an increased flow capacity, require thicker walls in order to withstand the internal pressures. However, as the wall thickness increases the pipe becomes stiffer and is therefore more difficult to wind onto a reel. As the pipe stiffness is directly related to the diameter of the pipe a large diameter pipe is more likely to collapse than small diameter pipes unless the wall thickness is substantially increased.

As the grouped entwined pipe 11 is made up of individual pipes 22, 23, each individual pipe 22, 23 can have a smaller wall thickness than a single large diameter pipe having the same or similar flow capacity as the grouped entwined pipe 11. With smaller diameters than an equivalent flow large pipe, the individual pipes 22, 23 of the grouped entwined pipe 11 retain their ability to withstand a higher pressure, as well as to be rolled onto a reel without collapsing. The individual pipes 22, 23 maintain these properties as part of the grouped entwined pipe 11 and hence effectively provide the equivalent volumetric flow of a larger diameter pipe but which can be wound onto a reel with minimal chance of collapsing.

Once the individual pipes 22, 23 have been twisted to form the grouped entwined pipe 11, they are retained in the twisted arrangement by applying an engagement means around the outside diameter of the grouped entwined pipe 11. The engagement means (not shown) can be a layer of shrink wrap wrapped around the outside diameter of the grouped entwined pipe 11 cable ties to lock the individual pipes 22, 23 together, an adhesive applied between the individual pipes, or otherwise as understood by the skilled addressee. Additionally, the ends of the individual pipes 22, 23 may be held in position by a coupling manifold 21 such as that shown in FIG. 6.

The power conduit 24 runs along the length of the grouped entwined pipe 11. The power conduit 24 is used to transport electricity between devices at either end of the grouped entwined pipe 11. For example where the grouped entwined pipe 11 is used to pump fluid, the power conduit 24 is used to supply electricity to the pump (not shown) at the end of the grouped entwined pipe 11. In another example where the grouped entwined pipe 11 is used on a travelling irrigation sprinkler the power conduit 24 is used to drive the movement of the traveling sprinkler and pump that supplies the grouped entwined pipe 11. Alternatively where water is used to drive the movement of the traveling sprinkler the power conduit 24 powers the pump.

The minor conduits 25 are used to house sensors along the length of the grouped entwined pipe 11. For example, where the grouped entwined pipe 11 is used in a bore hole pumping arrangement with a submersible pump, the minor cables carry pressure sensors. In this way when the water level in the bore lowers and approaches the pump, the pressure sensors are used to switch off the pump to avoid dry pumping and subsequent damage to the pump.

The power conduit 24 and minor conduits 25 can be attached to the grouped entwined pipe 11, by being entwined with the individual pipes 22, 23 within the shrink wrap, or ties may be used to hold the power conduit 24 and minor cables relative to the individual pipes 22, 23. In a varied arrangement, the power conduit 24 can be attached by a separate tie or alternative attachment device.

In a varied arrangement, the power conduit 24 can be separate to the grouped entwined pipes 11, or may be tied to only one of the individual pipes.

As the grouped entwined pipe 11 comprises more than one fluid passageway, it is possible to alter the flow capacity of the grouped entwined pipe 11 by blocking off one of the individual pipes 22, 23 to prevent, or restrict flow therethrough. Blocking one of the individual pipes 22, 23 with a valve (not shown) allows the flow to be regulated.

Figure 1:
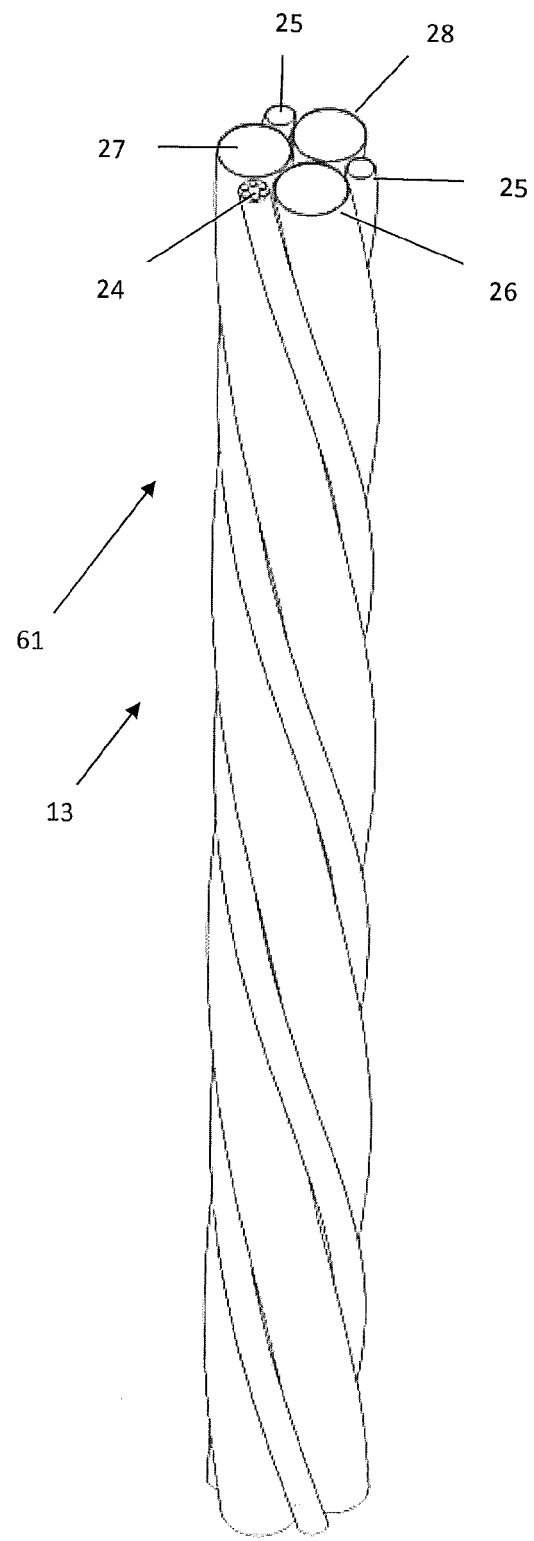
FIG. 1 is a perspective view of a grouped entwined pipe according to a second embodiment of the present invention.
Figure 3:
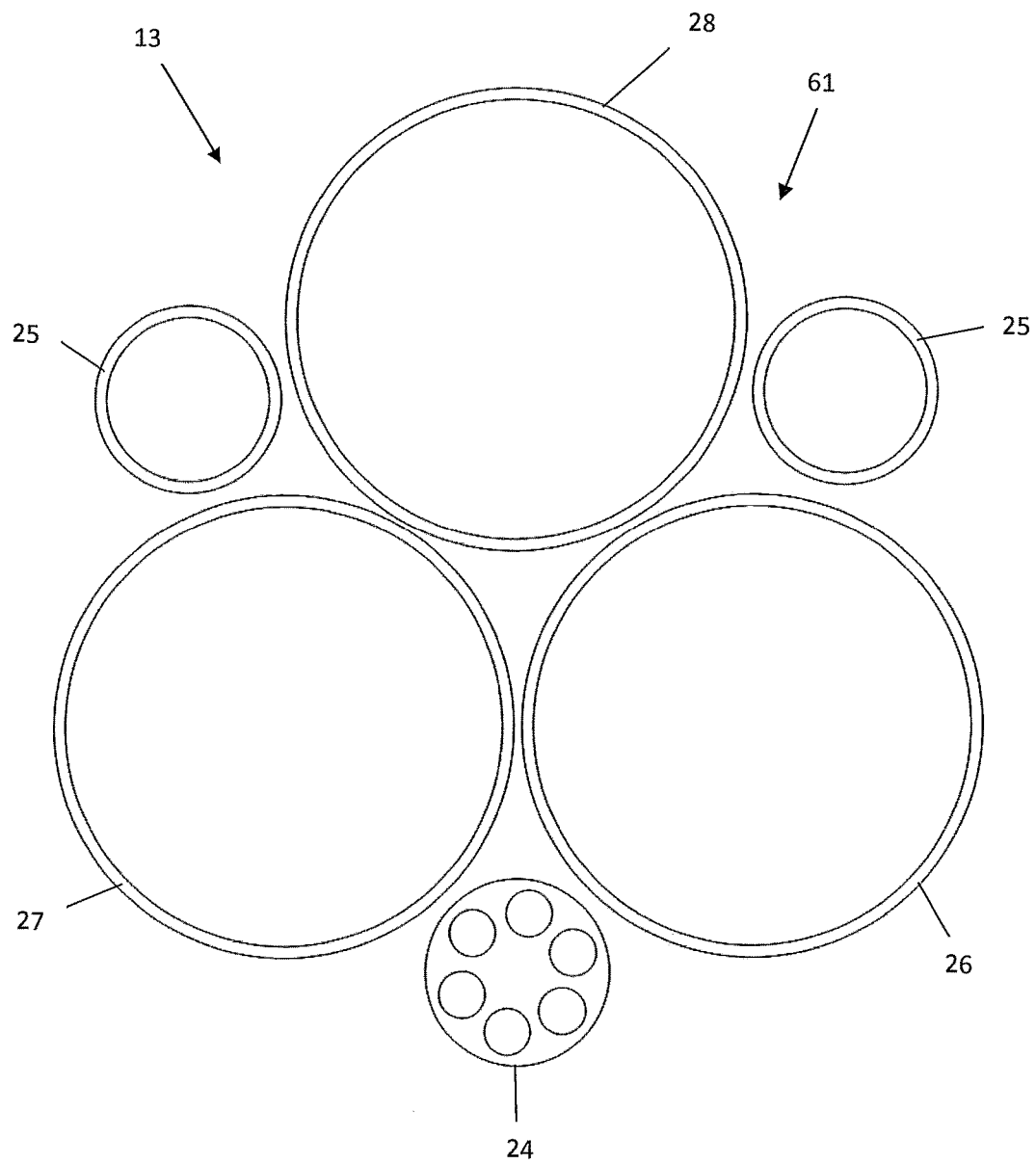
FIG. 3 is a front view of the grouped entwined pipe if FIG. 1.
Figure 4:
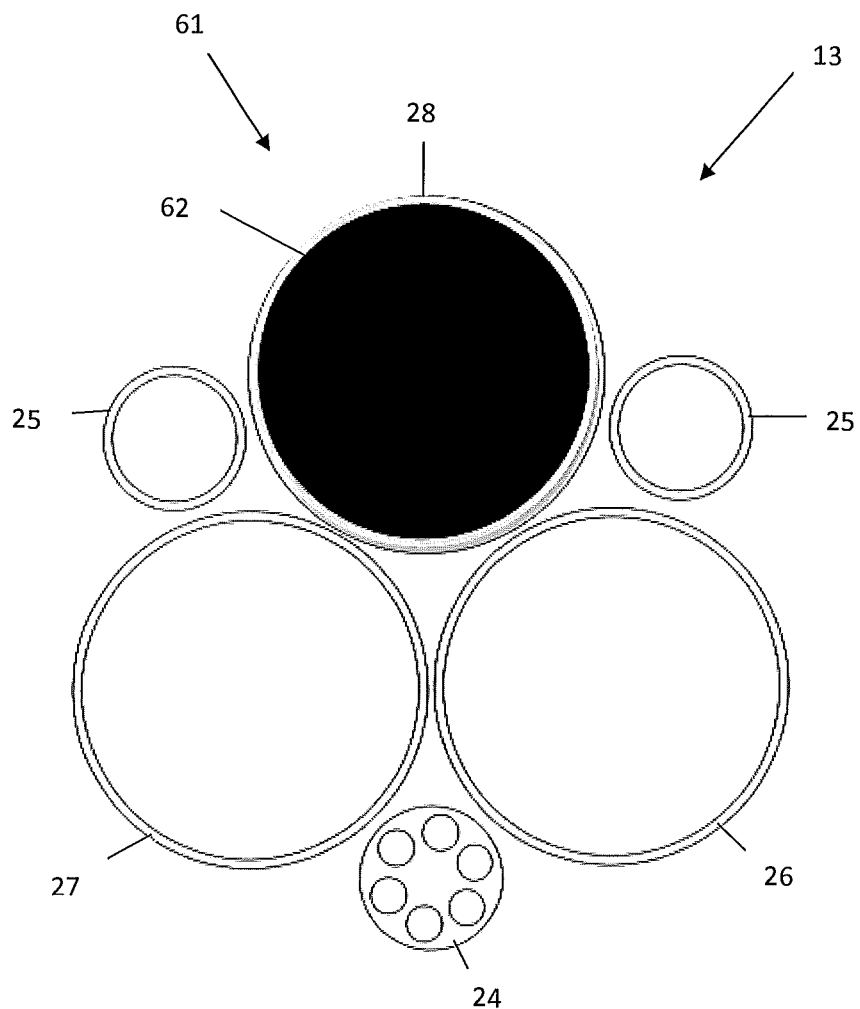
FIG. 4 is a front view of the grouped entwined pipe of FIG. 1.

FIGS. 1, 3 and 4 illustrate a second embodiment of the present invention. This embodiment is similar to the first embodiment and similar features have been given the same numbering. In this embodiment the grouped entwined pipe is in the form of conduit/grouped entwined pipe 13 comprises three individual pipes 26, 27, 28 rather than the two pipes 22, 23 of the conduit/grouped entwined pipe 11 entwined together.

Entwinement of the individual pipes 26, 27, 28 of the grouped entwined pipe 13 is achieved by twisting the individual pipes 26, 27, 28 like the strands of a rope relative to the central axis of the grouped entwined pipes 13 as described in the first embodiment. Grouped entwined pipe 13 uses 3 individual pipes 26, 27, 28. This entwinement can be achieved by arranging the pipes straight and adjacent each other and then twisting the pipes together.

Alternative forms of entwinement, such as braiding or plaiting may be used.

FIG. 4 illustrates the grouped entwined pipe 13 having pipe 28 blocked by a valve 62. The flow rate through the grouped entwined pipe 13 is reduced by blocking individual pipe 28 with valve 62, preventing the blocked pipe 28 from transporting fluid.

In a varied embodiment, to facilitate flow regulation one of the individual pipes 26, 27, 28 is associated with a valve (not shown). When the grouped entwined pipe 13 is attached to a pump or other fluid supply means, each individual pipe 26, 27, 28 within the grouped entwined pipe 13 is capable of transporting the fluid.

The flow rate through the grouped entwined pipe 13 can be reduced by one third by closing valve 62. This allows the grouped twisted pipe 13 to perform as a selectively variable flow pipe.

Varying the flow rate is aided with the use of a variable flow pump at the end if the grouped entwined pipe 13.

Figure 5:
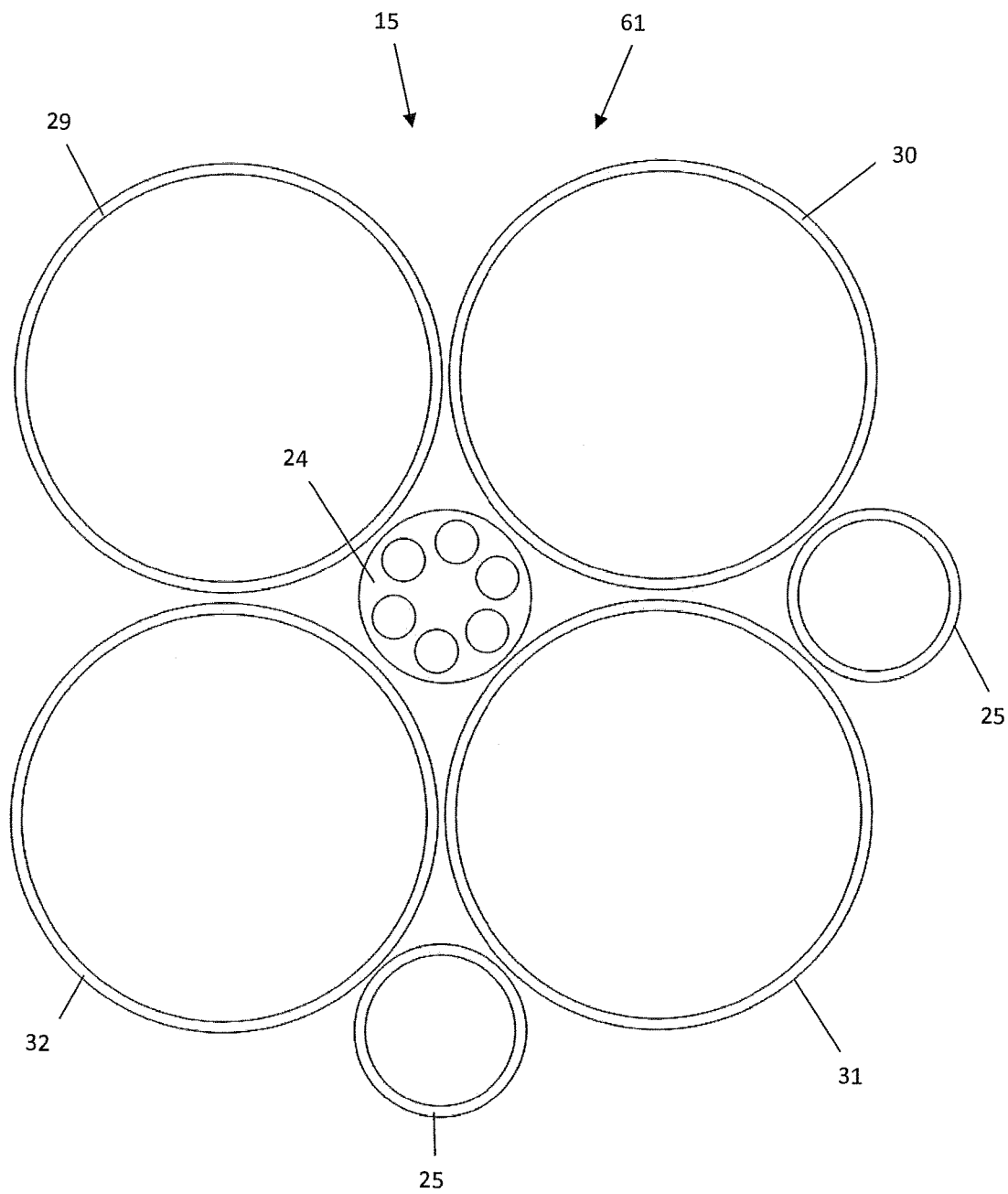
FIG. 5 is a front view of a grouped entwined pipe according to a third embodiment of the present invention.

FIG. 5 illustrates a third embodiment of the present invention which is similar to the first and second embodiments and similar features have been given the same numbering. In this embodiment the grouped entwined pipe is in the form of conduit/grouped entwined pipe 15 comprises four individual pipes 29, 30, 31, 32 entwined together.

Entwinement of the individual pipes 29, 30, 31, 32 of the grouped entwined pipe 15 is achieved by twisting the individual pipes 29, 30, 31, 32 like the strands of a rope around the central axis of the grouped entwined pipe 15 as described in the first and second embodiments. This grouped entwined pipe 15 is realised by arranging the individual pipes 29, 30, 31, 32 straight against each other and then twisting the pipes together. Other methods of twisting can be used and a varying number of individual pipes can be used.

It is within the scope of the present invention for the first and third embodiments to include valves to vary the flow rate of the grouped entwined pipe 11, 13 as described for the second embodiment.

In varied embodiments of the first second and third versions of the present invention, the pipes 22, 23, 24, 26, 27, 28, 29, 30, 31, 32 of the grouped entwined pipes 11, 13, 15 can be braided together.

Where a standard braiding technique is used to entwine the pipes 22, 23, 24, 26, 27, 28, 29, 30, 31, 32 together to form one of grouped entwined pipe 11, 13, 15, the braiding technique results in the length of each individual pipe 22, 23, 24, 26, 27, 28, 29, 30, 31, 32 being the same between opposite ends of the grouped entwined pipe 11, 13, 15, resulting in the beneficial characteristics discussed above with respect to the previous embodiments. Alternative entwinement methods are envisaged by the present invention, including plaiting, twisting or otherwise.

Although the above embodiments consider the grouped entwined pipe 61 as grouped entwined pipes 11, 13 and 15 with 2, 3 and 4 pipes, it is within the scope of the present invention to use more than four pipes to form the grouped entwined pipe in the manner as described for the first, second and third embodiments of the present invention.

Figure 6:
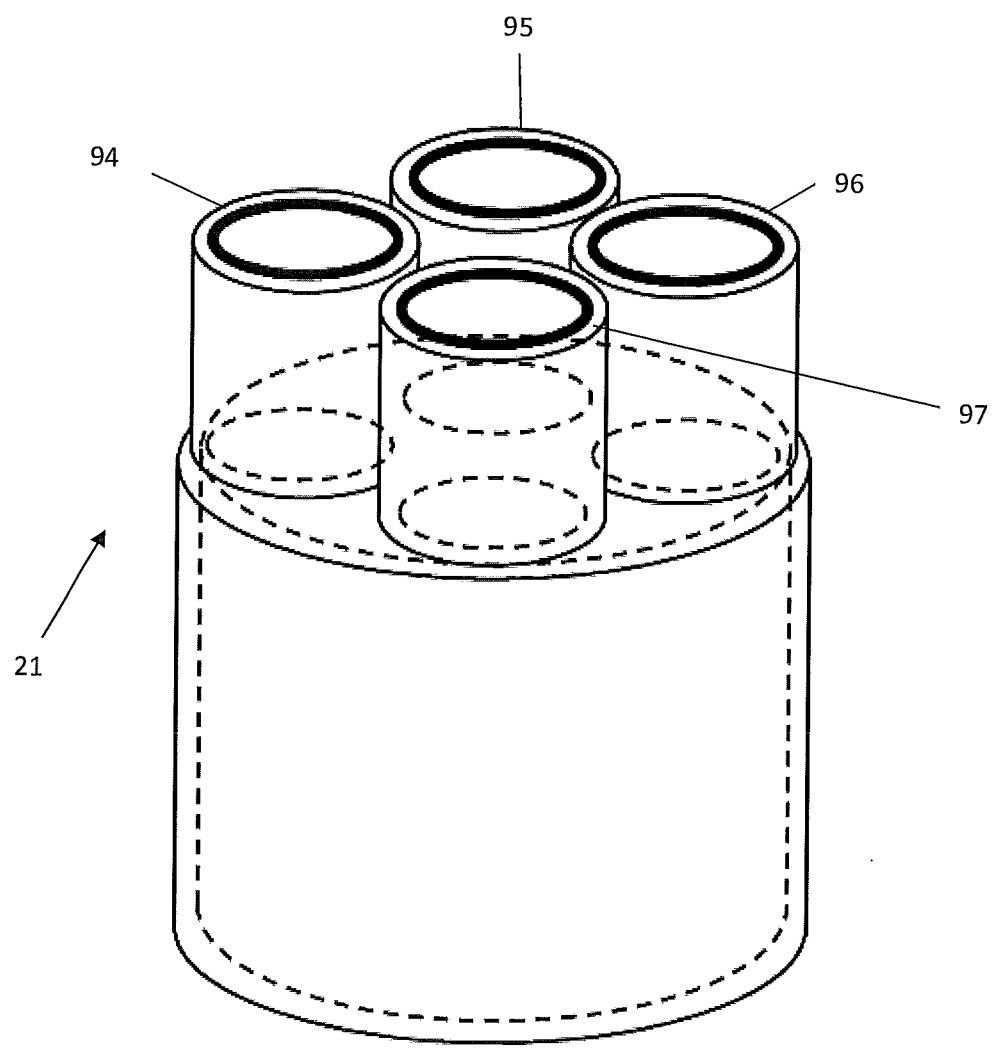
FIG. 6 is a perspective view of a manifold for use with the grouped entwined pipe of FIG. 5.

FIG. 6 shows a coupling manifold 21 which may be used to connect the pipes of grouped entwined pipe 15 to another device.

The manifold 21 may connect the grouped entwined pipe 15 to a pump, a travelling irrigation sprayer, a reservoir, other piping or other devices which may be used in high flow pumping. For ease of connection the manifold 21 can be arranged for quick engagement and quick release. The manifold is illustrated for use with the four pipe 29, 30, 31, 32 embodiment of grouped pipe 15. Each of the individual pipes 29, 30, 31, 32 are received and then lockingly engaged with one of the protrusions 94, 95, 96, 97. It is readily recognized that the manifold 21 can be configured to connect any number of pipes with an alternate number of protrusions.

It is readily recognisable that any number of the individual pipes in a grouped entwined pipe can be blocked with a valve as desired by the pipe user. This allows the grouped twisted pipe to perform as a selectively variable flow pipe.

Valves used to block pipes and control the flow of the grouped entwined pipe can be placed at either end of each individual pipe in the grouped entwined pipe. Then each individual pipe, can be shut off using a variety of typical valve arrangements readily understood by the skilled addressee. The shut off valves can be located in the manifold 21 or along the length of the individual pipes. The shut off valves can be used with a variable flow pump.

The individual pipes of the grouped entwined pipes 11, 13, 15 are made of a material that is suitable to be repeatedly wound onto and off a reel. One example is a high density polyethylene (HDPE) pipe. Alternatives materials, suitable for winding onto and from a reel, as would be understood by the skilled addressee can be used.

A HDPE pipe can typically be coiled onto a reel provided that the reel has an inside diameter at least 20 times greater than the diameter of the pipe. In a first example, a single 140 mm HDPE pipe (polyethylene) capable of providing a flow of 80 l/s requires a reel with an inside diameter of 2.8 m. Such a reel is too large to transport on a road without oversize load escorts and requires additional safety provisions. However, if instead the grouped entwined pipe 13 comprising three 90 mm HDPE pipes entwined together as per the present invention was used, the reel will require an inside diameter of 1.8 m. Once wound onto the reel, the reel will be 3.4 m in diameter, 2.4 m wide, carry nearly 500 m of 90 mm grouped entwined pipe, and is capable of providing higher flow rates, maintain a higher pressure rating and have walls of the same or smaller thickness than the 140 mm single pipe.

A grouped entwined pipe 61 (that could be any of the grouped entwined pipes 11, 13, 15) of the present invention is ideal for use in pumping bores. A reeled entwined grouped pipe can be lowered into a bore with a pump attached to one of its ends. A grouped entwined pipe 13 comprising three 90 mm individual pipes can achieve a fluid flow of 80 liters per second and higher. By using the grouped entwined pipe 13, the need to connect straight lengths of larger diameter pipe while the pipe is being lowered into the bore as discussed in the background section is removed and the reeled grouped entwined pipe 13 can simply be lowered into the bore from the reel. The reeled entwined grouped pipe 13 can be lowered into, or raised from a bore in a fraction of the time required to raise and lower a pipe that is in sections. Furthermore it removes the need to use a crane to lower the pipe.

Another application of the use of the entwined grouped pipe 61 is with self-travelling irrigation sprinklers. Long rolls of entwined grouped pipe on large reels can be used to supply a self-travelling irrigation system. The length of the entwined grouped pipe of the present invention on the reels can now be up to 700 or 800 m long or longer. Where the grouped entwined pipe comprises individual pipes of 90 mm diameter, a longer travel length is achievable than with a 140 mm single pipe. Also, advantageously the grouped entwined pipe 61 of 90 mm individual pipes can be reeled and transported on the back of a truck un-escorted.

An additional example uses the entwined grouped pipe 61 in a test pumping situation. The entwined group pipe is placed in the test fluid and the valves are selectively shut off to achieve the desired flow rate with the use of a variable flow pump in combination with a variable speed drive to achieve a wide range of flows from a single submersible pump, without loss of data. The variable flow pump is lowered into the fluid to be tested and different desired flows from the fluid source can be achieved by opening and closing the valves at different pump settings without the need to withdraw and change the pipe and pump used.

FIGS. 7 to 16 illustrate a downhole pumping assembly 90, 91 including reels 50, 51 according to further embodiments of the present invention, where the reels 50, 51 are suited to hold and carry a grouped entwined pipe 61. As noted above, the grouped entwined pipe 61 may be in the form of any of grouped entwined pipes 11, 13, 15 (in addition to one with more than 4 individual pipes) and is adapted to be wound on and off a reel 50, 51 repeatedly into a bore hole, mine, or other passageway.

Figure 7:
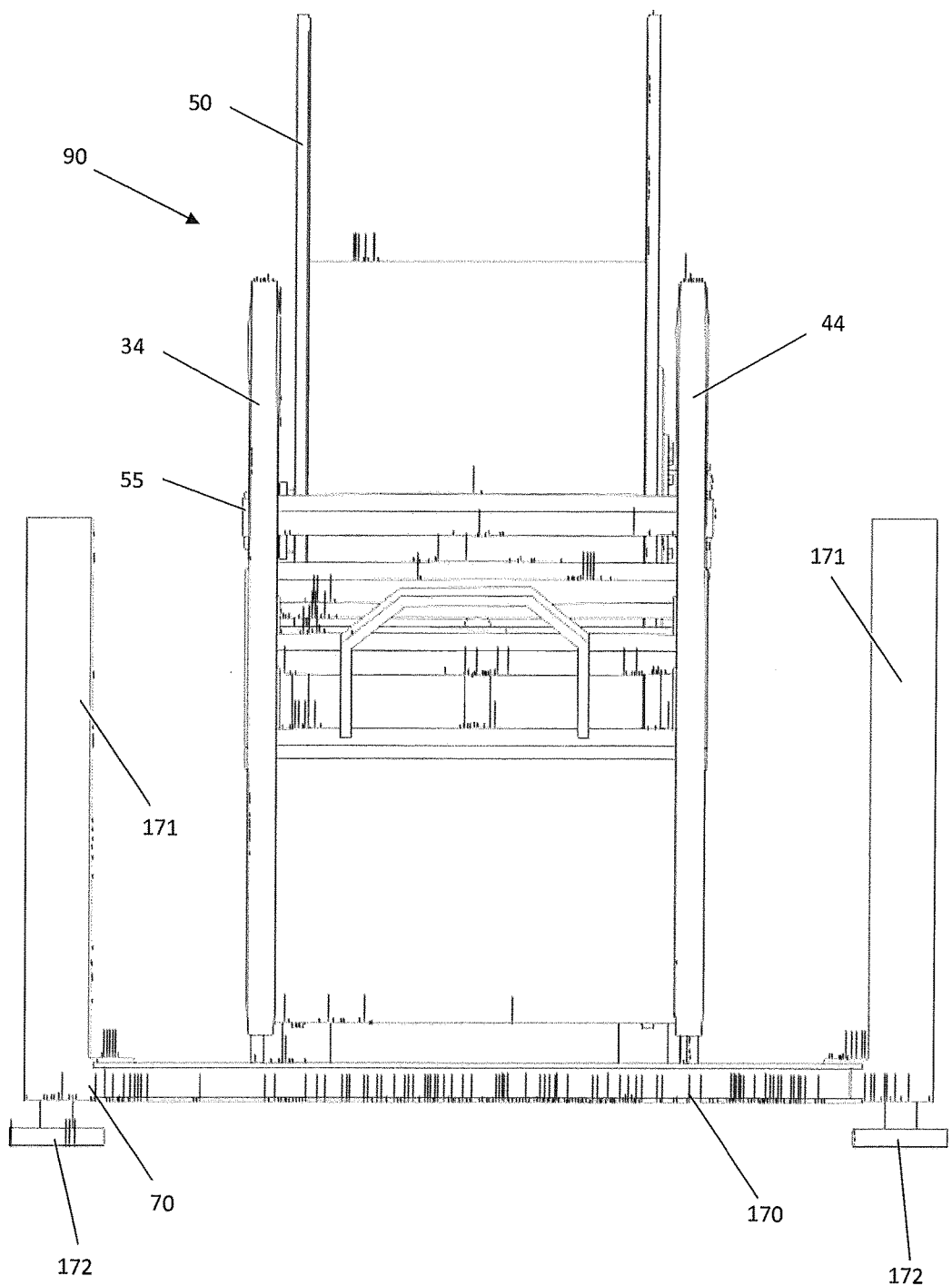
FIG. 7 is a front view of a downhole pumping assembly according to a fourth embodiment of the present invention.
Figure 8:
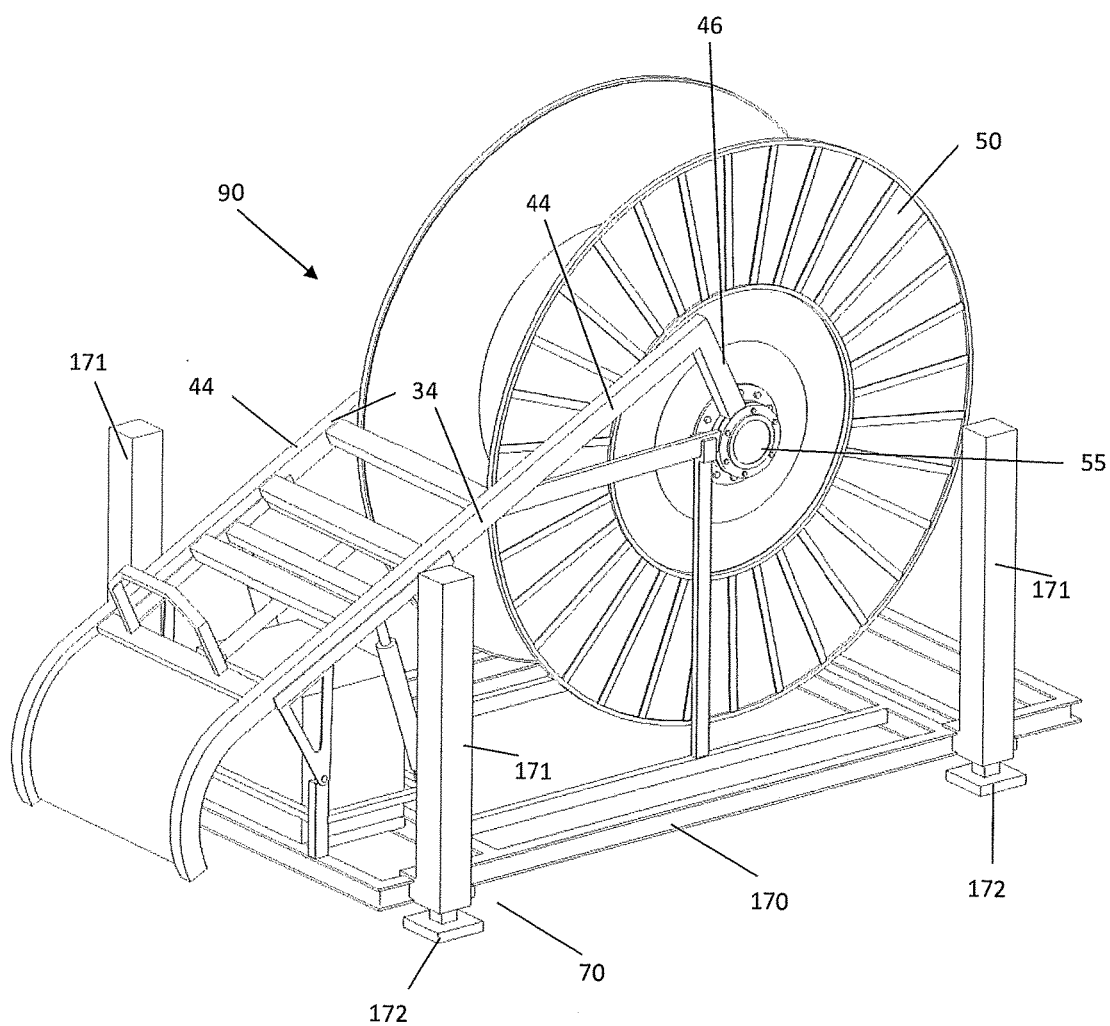
FIG. 8 is a perspective view of the downhole pumping assembly of FIG. 7.
Figure 9:
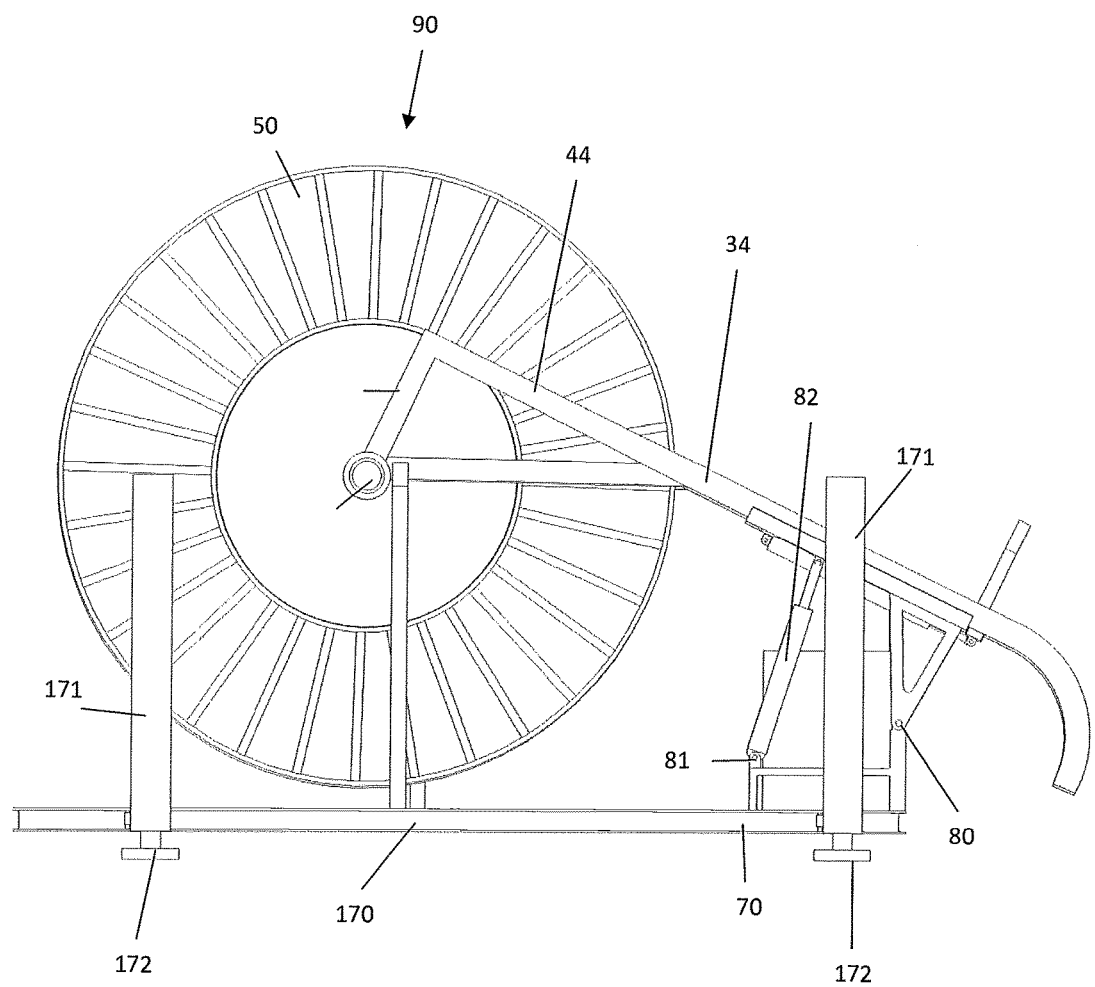
FIG. 9 is a side view of the downhole pumping assembly of FIG. 7.
Figure 10:
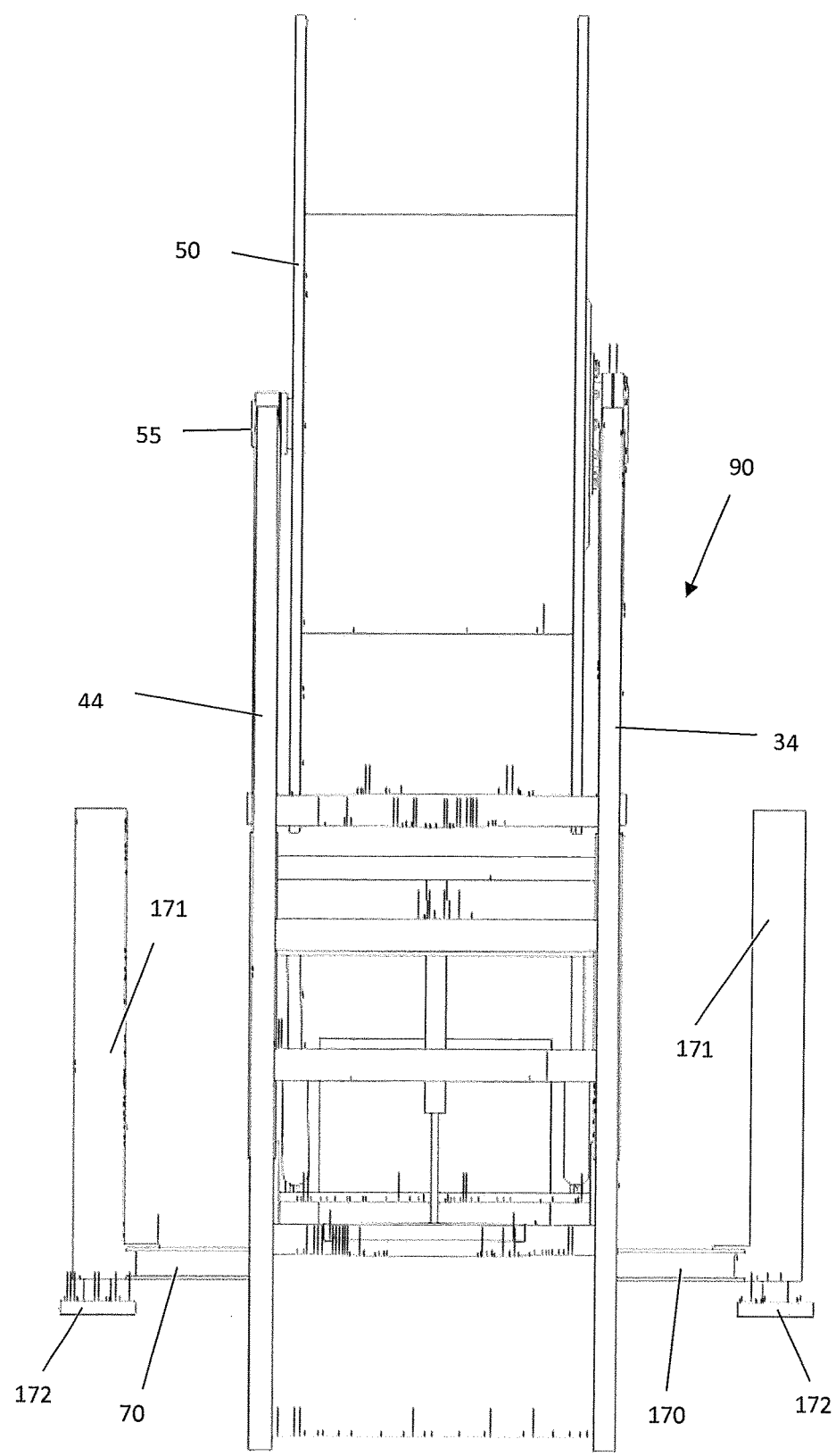
FIG. 10 is a front view of a downhole pumping assembly of FIG. 7.
Figure 11:
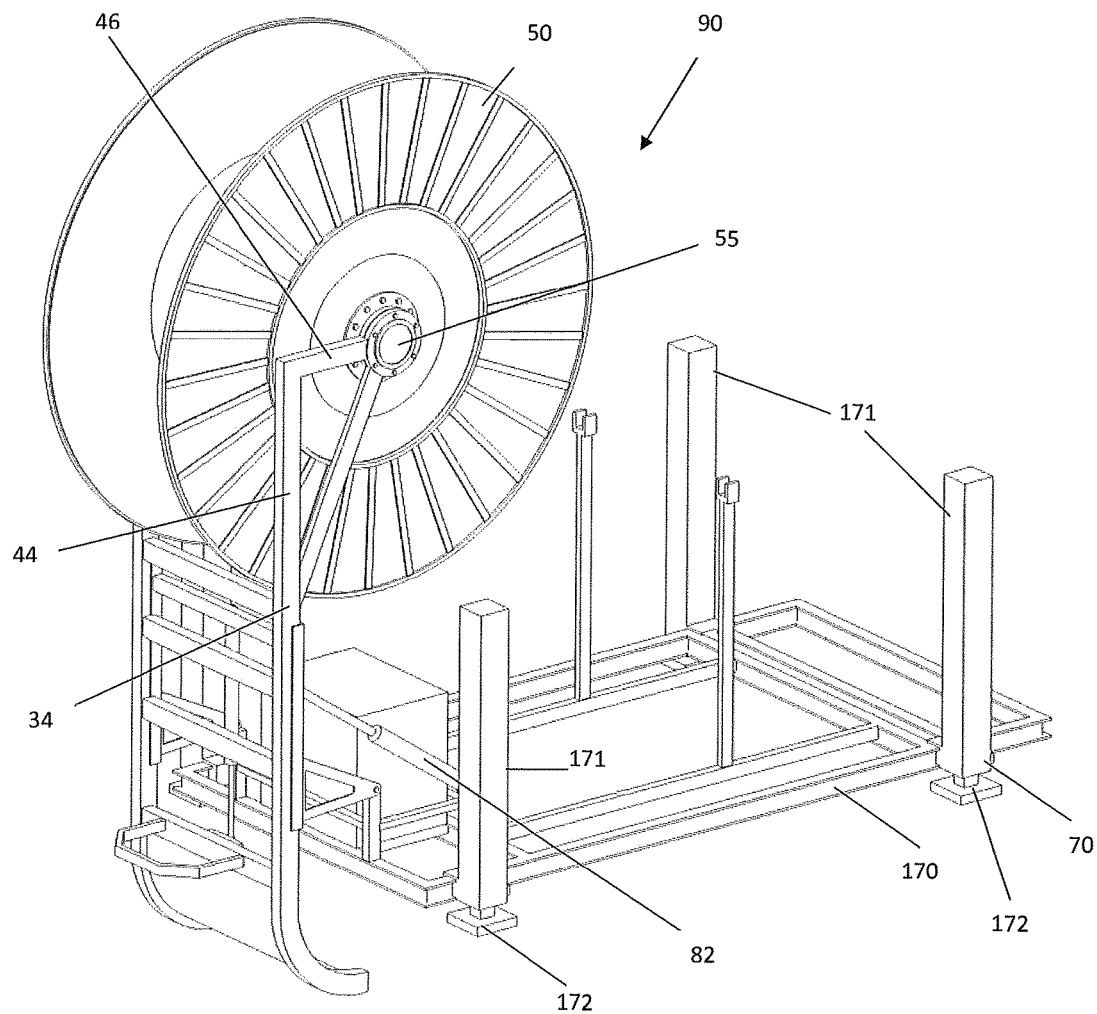
FIG. 11 is a perspective view of the downhole pumping assembly of FIG. 7.
Figure 12:
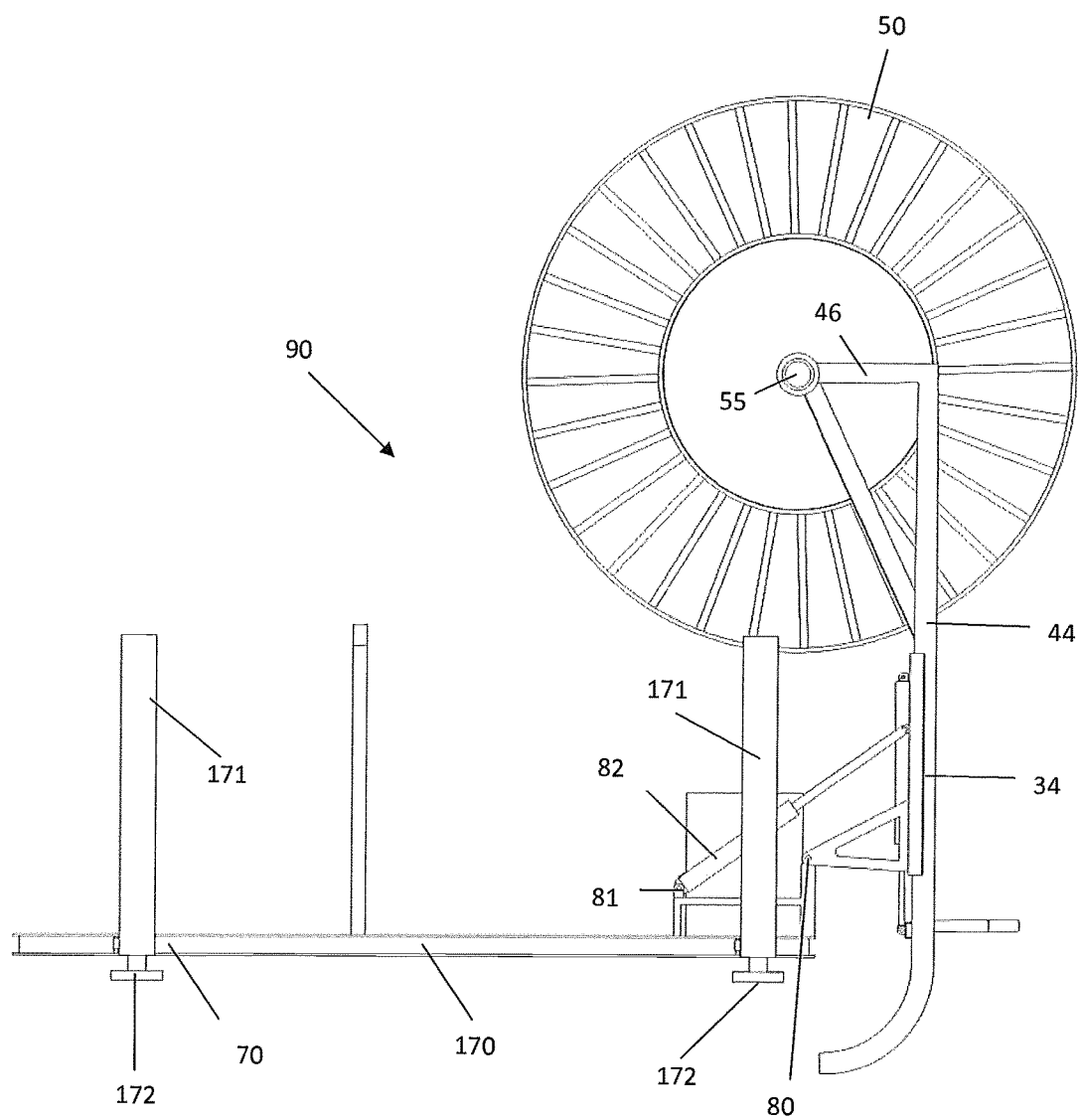
FIG. 12 is a side view of the downhole pumping assembly of FIG. 7.

With particular reference to FIGS. 7 to 12, illustrating the fourth embodiment of the present invention, the downhole pumping assembly 90 includes a mast 34 fixed to frame 70 for support. The frame 70 includes a base 170 and uprights 171. The frame 70 is adapted to sit on a support means above the bore hole, mine or other passageway as required. The reel 50 is rotatably mounted onto mast 34 about pin 55. The mast 34 moves the reel between a stored condition as shown in FIGS. 7, 8 and 9 and an installation condition as shown in FIGS. 10, 11 and 12 which will be described below in further detail. The mast 34 includes an extension arm 44 and a supporting arm 46. The pin 55 is located along the supporting arm 46.

Alternatively, the frame uprights 171 of the frame 70 can extend downwards to raise the base 170 and support the frame on plates 172. In this arrangement the frame 70 supports itself over the bore hole, mine or passageway.

FIGS. 7 to 9 illustrate the mast 34 and reel 50 placing the downhole assembly 90 in the stored position. The mast 34 is fixed to the frame 70 at pivot hinge 80 and actuator pivot hinge 81. In the stored position, the hydraulic actuator 82 is retracted causing the mast 34 and reel 50 to be lowered against the frame 70. To enable this, the mast 34 pivots around pivot hinge 80 to angle the mast into a lowered position. This minimizes the height of the downhole assembly 90 increasing the ease with which the downhole assembly can be transported.

FIGS. 10 to 12 illustrate the mast 34 and reel 50 placing the downhole assembly 90 upright into the installation position. The mast 34 is fixed to the frame 70 at pivot hinge 80 and actuator pivot hinge 81. In the installation position, the hydraulic actuator 82 is extended causing the mast 34 and reel 50 to be raised into an upright position.

When in the installation position, a drive means such as a motor is used to wind the reel 50 and lower or raise the grouped entwined pipe 61 into or from the bore hole, mine or passageway.

The hydraulic actuator 82 and the drive means are controlled through electronic control means such as a PLC, or otherwise as would be understood by the skilled addressee. The PLC or other control means is located on the downhole assembly 90. Alternatively the PLC or other control means is remote control.

In the fourth embodiment, the grouped entwined pipe 61 (not shown in FIGS. 7 to 12) carries fluid at a flow rate of 80l/s or greater and is able to be wound onto a reel repeatedly without collapsing on itself. To achieve the flow of 80 l/s or greater, the individual pipes of the group of entwined pipe 61 have an internal diameter of at least 80 mm. The individual pipes of the group of entwined pipe 61 act together to transport fluid and collectively achieve the desired flow rate. The entwinement of the pipes to form the grouped entwined pipe 61 ensures that the length of each individual pipe along the length of entwined pipe 61 is equal and that fluid travelling through the pipes travels the same distance and enters and exits the grouped entwined pipe 61 at the same time. By entwining smaller diameter pipes to form the grouped entwined pipe 61, the pipe 61 will not collapse when reeled as would happen with a pipe of larger diameter, capable of supporting the flow of grouped entwined pipe 61. This is due to larger diameter pipes having a lesser stiffness than smaller diameter pipes of the same wall thickness.

It is within the scope of the present invention for the flow rate to be varied from 80 l/s as would be understood by the skilled addressee.

Figure 13:
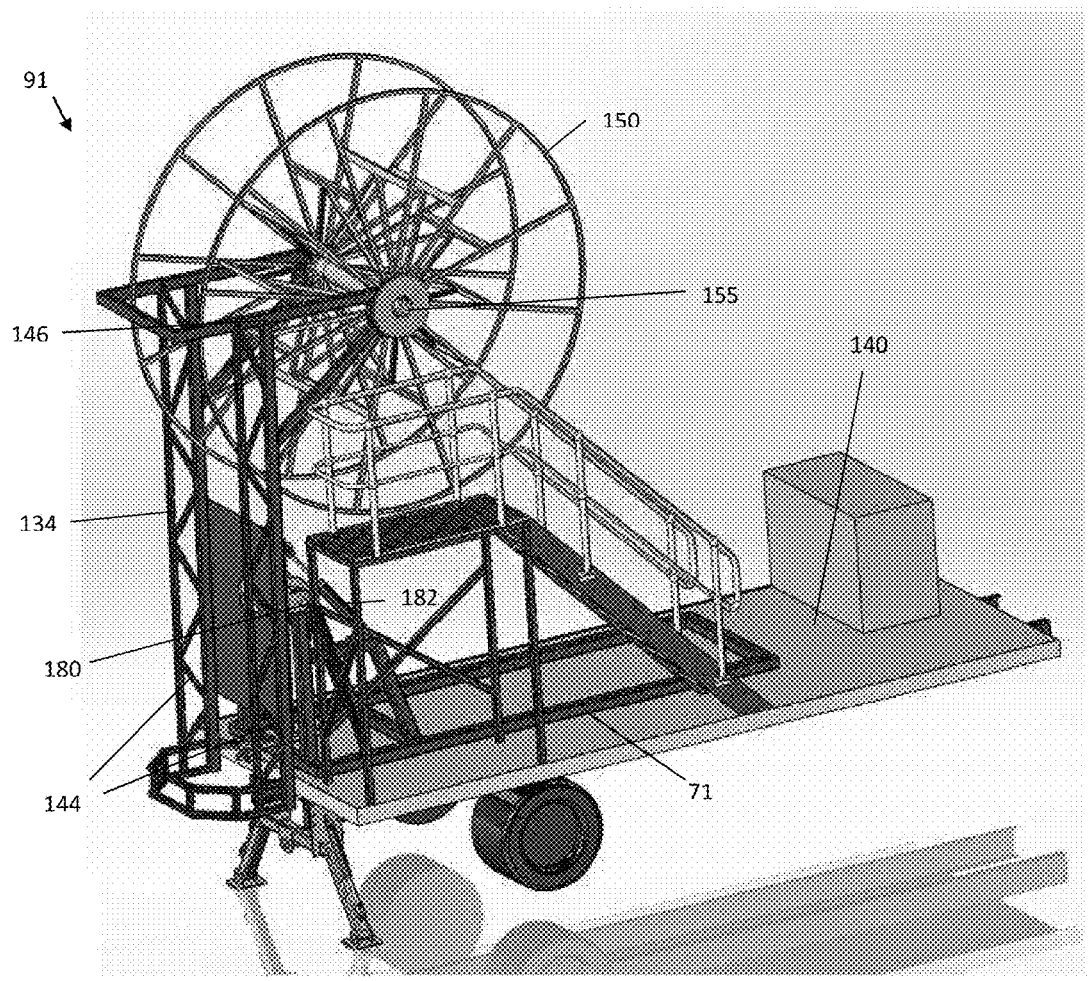
FIG. 13 is a perspective view of a downhole pumping assembly in accordance with a fifth embodiment of the present invention.
Figure 14:
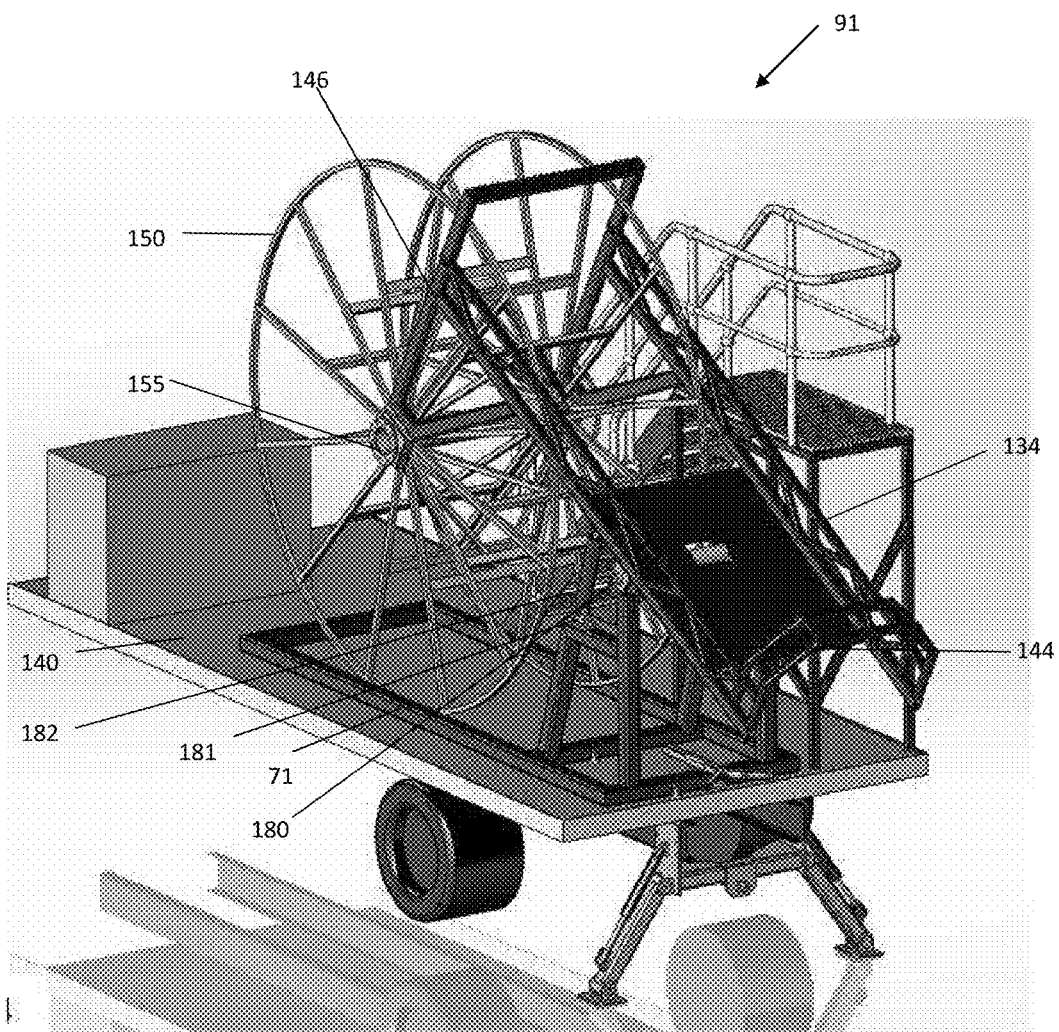
FIG. 14 is a perspective view of the downhole pumping assembly of FIG. 13.

FIGS. 13 and 14 illustrate a fifth embodiment of the present invention. The fifth embodiment is similar to that of the fourth embodiment. The downhole pumping assembly 91 is mounted to a frame 71. The frame is mounted on a tray 140 of a truck 240. As in the fourth embodiment, the reel 51 is rotatably mounted onto mast 134 about pin 155. The mast 134 moves the reel between a stored condition as shown in FIG. 14 and an installation condition as shown in FIG. 13. The mast 134 includes an extension arm 144 and a supporting arm 146. The pin 155 is located along the supporting arm 146.

The mast 134 is fixed to the frame 71 along the base of the frame 71. The mast 134 moves between the stored position and the installation position at pivot hinge 180 and actuator pivot hinge 181. In the stored position of FIG. 14, the hydraulic actuator 182 is retracted causing the mast 134 and reel 51 to be lowered against the frame 71. The hydraulic actuator 182 is mounted to the frame 71.

In the installation position of FIG. 13, the hydraulic actuator 182 is extended causing the mast 134 and reel 51 to be raised into an upright position.

Figure 15:
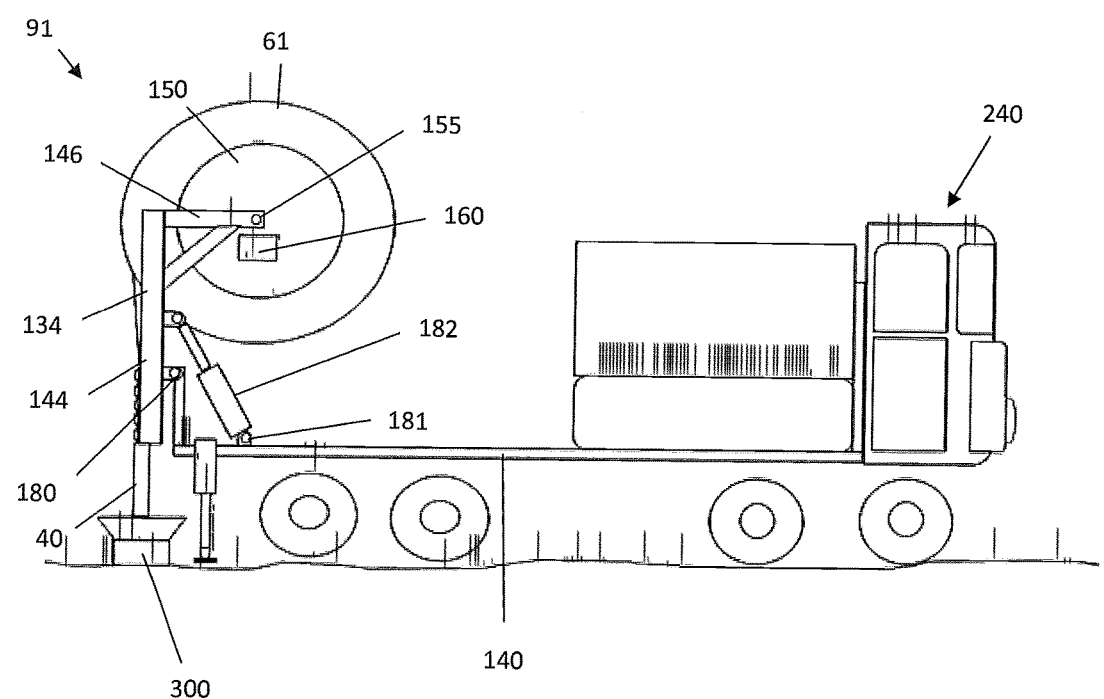
FIG. 15 is a plan view of a downhole pumping in accordance with a sixth embodiment of the present invention.
Figure 16:
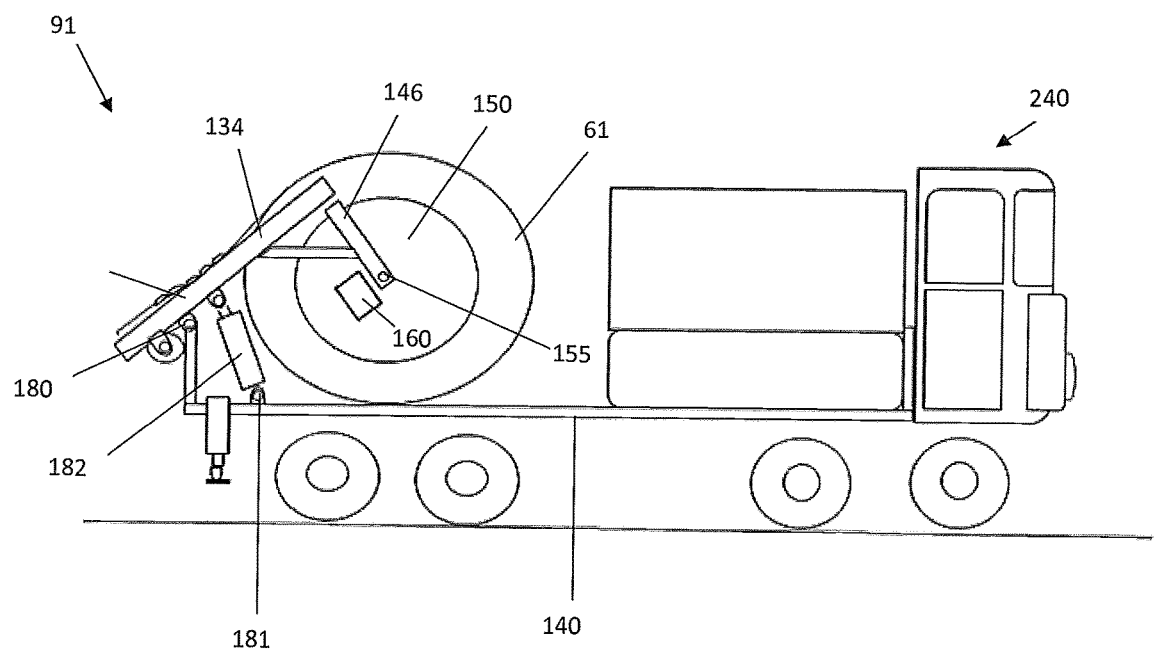
FIG. 16 is a plan view of the downhole pumping assembly of FIG. 15.

FIGS. 15 and 16 illustrate the fifth embodiment of the present invention including a grouped entwined pipe 61 wound onto the reel 51, where the downhole pumping arrangement 91 is mounted on the tray 140 of a truck 240. In FIG. 16 the mast 34 is shown in the stored position where it is at an angle to the vertical and rests on the tray 140 of the truck 240. In this embodiment the mast 34 is also place in the operating condition when the reel 51 is to be transported.

In FIG. 16 the mast 134 is shown in the installation condition whereby the mast 134 is in a generally upright position. The hydraulic arm 138 attached to the tray of the truck selectively moves the mast 134 and reel 51 between the angled operating condition and the installation condition. When in the installation condition a support leg 142 is extended from the tray of the truck 240 to ensure that the body of the truck 240 is supported and does not overbalance.

The reel 51 is placed in the stored condition as shown in FIG. 15 to transport the downhole pump assembly 91. The downhole pump assembly 91 can also be placed in the stored position once the grouped entwined pipe 61 has been unwound from the reel 51 in the installation position and then pump the bore in the stored position.

Although mast 134 is illustrated as raising the reel 51, it is readily understood that alternative frames can be used to raise the reel 51 in a manner which will allow the reel 51 to rotate. It is to be understood that the mast 134 and reel 51 or alternative frame need not be mounted on a truck and can be located at the site of the bore hole 300 where the grouped entwined pipe 61 is to be deployed.

In operation, the truck 240 is positioned correctly about the bore 300. When in position, the hydraulic arm 138 extends and raises the mast 134 into the upright position to be in the installation position. When in the upright position, the drive means, in the form of motor 160, is activated to rotate the reel 51 so that grouped entwined pipe 61 is unwound and the pump 40, which is fixed on the distal end of the grouped entwined pipe 61, is lowered into the bore 300. The grouped entwined pipe 61 supports the weight of the pump 40. An electricity cable (not shown) powers the pump 40 and is lowered with the grouped entwined pipe 61.

The motor 160 to drive the reel 51 is illustrated in FIGS. 15 and 16 as being powered by a generator and fuel, both of which are transported with the truck 240. The generator and fuel can be of a conventional hydrocarbon burning generator, can be solar assisted or otherwise. The generator and fuel can be transported with the truck 240 or alternatively can be located at the site of the bore 300.

Although a hydraulic arm 138 is illustrated as moving the mast 134, it is recognized that a pivoting arm arrangement or other mechanical actuator can be used to move the mast 134. Additionally it is recognised that instead of rotating the mast 134, a translation action can position the mast 134 in a variety of positions appropriate for transportation, lowering and pumping the downhole pumping assembly 91.

The downhole pump assembly 91 can be skid mounted so that at the site of operation, the downhole pump assembly 91 can be lifted from a transportation vehicle such as the truck 240, or another vehicle and placed on a frame at the site for operation as discussed above.

Once the truck 240 is correctly positioned (or once the downhole pump assembly 30 has been removed from the truck 240 or other vehicle and placed on a positioned frame) the operation of the motor to turn the reel and lower the pipe 32 and electrical cable, and then to activate the pump 40 can be switched on. An operator need only switch the motor on and off at appropriate times to lower the pipe 32 to the appropriate depth and then activate the pump 40 for the required time. With current wireless technologies this can be done remotely and the presence of a technician is only required to position the pipe 32 and reel 48 correctly.

The use of sensors can be employed so that there is no direct input from a technician at all. This removes the need for cranes, suspended loads, straight lengths of heavy, large diameter pipe and the need to join the pipe. The motor assisted raising or lowering of the grouped entwined pipe 61 onto or from the reel 51 can take as little as 10 minutes. Also as there is no need for a technician to operate the pumps, night pumping can be autonomously undertaken.

The individual pipes of the grouped entwined pipe 61 can be selectively closed to regulate the flow through the grouped entwined pipe 61, and different pump settings can be used accordingly. When a variable flow pump the arrangement of the grouped entwined pipe 61 negates the no need to change pipes of different diameter and pumps of different capacity for different applications and required flows. Instead individual pipes may be closed or opened to regulate the flow there through. As a result, the grouped entwined pipe 61 may be caused to perform as a pipe of smaller diameter. These functions can also be operated remotely.

With the use of a variable speed pump and grouped entwined pipe 61, the need to change pumps 40 between different diameter individual pipes is removed. With the removal of the need to change pumps, a variable speed pump can be connected to an entwined group of pipes and the two can operate together for the operating lifespan of either the grouped entwined pipe 61 or the pump 40. With a grouped entwined pipe 61 and pump 40 that can operate at different flows, there is no need to change the pump 40 on the grouped entwined pipe 61, and the two can remain joined for the life of either the pump 40 or the grouped entwined pipe 61.

To operate the downhole pumping assembly 91, the truck 240 is driven into position about the bore hole 300. When in position, the mast 134 is raised into the installation condition and the motor 160 activates to unwind the grouped entwined pipe 61. When the grouped entwined pipe 61 reaches the desired position the unwinding ceases and the mast 134 is lowered into the operating condition and the pump 40 initiates pumping. When pumping is complete, the mast 134 is raised again into the installation condition and the motor 160 operates to raise the grouped entwined pipe 61 from the bore 300, winding it onto the reel 51.

It is within the scope of the present invention for the downhole pumping assembly 90, 91 to be located on a frame and not include a mast. In this arrangement, the frame is placed over the bore hole, mine or passageway and then lower the grouped entwined pipe into the bore hole, mine or passageway without being raised on a mast.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A repeatedly usable downhole pumping assembly adapted to pump fluid from a fluid reservoir external to the downhole pumping assembly comprising:
    a fluid passageway comprising a plurality of pipes for pumping fluid from the fluid reservoir, the pipes having a length, wherein the pipes are uniformly entwined together along the length of the pipes to provide multiple fluid passageways;
    a rotatably mounted reel upon which the fluid passageway is adapted to be wound onto without collapsing;
    a pump for pumping fluid through the conduit; and
    a driving means to lower and raise the conduit relative to the bore;
    wherein the fluid passageway is adapted to be moved from an installation condition to an operating condition once the pump has been lowered into the fluid reservoir prior to activating the pump.

2. The repeatedly usable downhole pumping assembly as claimed in claim 1, further comprising a mast to which the reel is rotatably mounted, wherein the mast is moveable between an installation condition and an operating condition.

3. The repeatedly usable downhole pumping assembly as claimed in claim 2, wherein the installation condition positions the mast in an upright position.

4. The repeatedly usable downhole pumping assembly as claimed in claim 1, further comprising a mast to which the reel is rotatably mounted wherein the mast includes an installation condition and an operating condition, and wherein the installation condition of the mast and the operating condition of the mast are the same position.

5. The repeatedly usable downhole pumping assembly as claimed in claim 1, wherein the downhole pumping assembly is located on a transportable platform.

6. The repeatedly usable downhole pumping assembly as claimed in claim 5, wherein when the conduit is wound onto the reel, and the reel is adapted to be transported on a truck.

7. A method of installing, operating and withdrawing a transportable downhole pumping assembly from a bore, comprising:
    positioning the downhole pumping assembly around the bore;
    unwinding a reeled fluid passageway and lowering the fluid passageway into the bore;
    pumping fluid from the bore;
    ceasing pumping; and
    winding the fluid passageway onto the reel to raise and withdraw the fluid passageway from the bore;
    wherein the fluid passageway comprises a plurality of pipes for pumping fluid from the bore, the pipes having a length;
    wherein the pipes are uniformly entwined together along the length of the pipes to provide multiple fluid passageways; and
    wherein, after lower the fluid passageway into the bore, the assembly is moved from an installation condition to an operating condition prior to activating the pump.

8. The method as claimed in claim 7, further comprising the steps of:
    moving the reeled non-collapsed fluid passageway into the installation condition;
    unwinding the fluid passageway and lowering the fluid passageway into the bore;
    positioning the reeled fluid passageway into the operating condition and pumping fluid from the bore;
    ceasing pumping; and positioning the reeled fluid passageway into the installation condition and winding the fluid passageway onto the reel to raise and withdraw the fluid passageway from the bore.

9. A method of installing, operating and removing a transportable high flow downhole pumping assembly relative to a bore the assembly being located on a vehicle and movable between an stored condition and an installation condition, the method comprising:
   positioning the assembly relative to the bore such that a fluid passageway of the assembly may be received in the bore;
   activating a drive means to cause the fluid passageway to be lowered into the bore the required depth;
   activating a pump to pump fluid from the bore through the fluid passageway;
   wherein the fluid passageway comprises a plurality of pipes for pumping fluid from the bore, the pipes having a length;
   wherein the pipes are uniformly entwined together along the length of the pipes to provide multiple fluid passageways; and
   wherein, after lowering the fluid passageway into the bore, the assembly is moved from the installation condition to an operating condition prior to activating the pump.

10. The method as claimed in claim 9, wherein the assembly is moved from the stored condition to the installation condition after the assembly is positioned relative to the bore.

11. The method as claimed in claim 9, wherein the pump is regulated to adjust the flow rate without the need to remove the fluid passageway from the bore.

12. The method as claimed in claim 9, wherein the assembly is moved to the installation condition and the fluid passageway is wound back on to the reel when the pumping is complete.

13. The method as claimed in claim 9, wherein the driving means is remotely operable.

14. The method as claimed in claim 9, wherein the pump is remotely operable.

15. The method as claimed in claim 9, wherein the pump includes a variable speed drive to enable pumping of different flow rates.

16. The method as claimed in claim 9, wherein the downhole pumping assembly is adapted to be transported on the back of a truck.

17. The method as claimed in claim 9, wherein the downhole pumping assembly is adapted to operate on the back of a truck.

18. A downhole pumping assembly located on a tray of a truck for pumping fluid from a bore, comprising:
   a fluid passageway having a high flow rate capacity;
   a reel upon which the fluid passageway is wound, the reel being rotatably mounted to a supporting frame;
   a pump for pumping fluid through the fluid passageway and a driving means to lower and raise the fluid passageway relative to the bore wherein the supporting frame is positionable into an installation condition from which the fluid passageway is adapted to be unwound to lower and rewound to raise, and an operating condition from which the assembly pumps fluid;
   wherein the fluid passageway comprises a plurality of pipes for pumping fluid from the bore, the pipes having a length;
   wherein the pipes are uniformly entwined together along the length of the pipes to provide multiple fluid passageways; and
   wherein, after lowering the fluid passageway into the bore, the assembly is moved from the installation condition to the operating condition prior to activating the pump.

* * * * *